United States Patent
Piotrowski et al.

(10) Patent No.: US 6,990,482 B1
(45) Date of Patent: Jan. 24, 2006

(54) SYSTEM AND METHOD FOR THE STORAGE AND ACCESS OF ELECTRONIC DATA IN A WEB-BASED COMPUTER SYSTEM

(75) Inventors: Joanne M. Piotrowski, Gaithersburg, MD (US); James L. Stamper, Portland, OR (US); Michael Edward Steele, Brookeville, MD (US); Jordan Vause, North Potomac, MD (US); Andra M. Tongier, Frederick, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 344 days.

(21) Appl. No.: 09/702,549

(22) Filed: Oct. 31, 2000

Related U.S. Application Data

(60) Provisional application No. 60/162,643, filed on Nov. 1, 1999.

(51) Int. Cl.
G06F 17/30 (2006.01)

(52) U.S. Cl. .................. 707/3; 707/4; 707/10
(58) Field of Classification Search .............. 707/3, 707/4, 10, 5
See application file for complete search history.

(56) References Cited

U.S. PATENT DOCUMENTS

| | | | |
|---|---|---|---|
| 5,321,423 A | | 6/1994 | Yoshizawa et al. ......... 345/185 |
| 5,428,776 A | | 6/1995 | Rothfield ................... 395/600 |
| 5,761,499 A | | 6/1998 | Sonderegger ............... 395/610 |
| 5,924,090 A | * | 7/1999 | Krellenstein ................ 707/5 |
| 5,940,831 A | * | 8/1999 | Takano ....................... 707/10 |
| 5,970,486 A | | 10/1999 | Yoshida et al. ............ 707/4 |
| 5,974,418 A | * | 10/1999 | Blinn et al. ................ 707/100 |
| 5,983,246 A | | 11/1999 | Takano ....................... 707/514 |
| 5,987,513 A | * | 11/1999 | Prithviraj et al. .......... 709/223 |
| 6,023,572 A | | 2/2000 | Lautzenheiser et al. ..................... 395/500.23 |
| 6,128,635 A | * | 10/2000 | Ikeno ........................ 715/532 |
| 6,339,767 B1 | * | 1/2002 | Rivette et al. .............. 707/2 |
| 6,456,308 B1 | * | 9/2002 | Agranat et al. ............ 707/501.1 |
| 6,560,633 B1 | * | 5/2003 | Roberts et al. ............. 709/202 |

FOREIGN PATENT DOCUMENTS

| | | |
|---|---|---|
| EP | 0924628 A2 | 6/1999 |
| JP | 11-85454 | 3/1999 |
| WO | WO 99/52042 | 10/1999 |

* cited by examiner

Primary Examiner—Jean M. Corrielus
Assistant Examiner—Baoquoc N. To
(74) Attorney, Agent, or Firm—Marsh Fischmann & Breyfogle LLP

(57) ABSTRACT

A system and method for the organization and storage of organizational assets such that these items are accessible through employment of various web-based tools. The system includes a database within which a number of assets and/or related information may be stored. Included with each entry in the database is at least one classification identifier which is searchable. A user of the system described herein may access the system over a data network such as the Internet, and through the employment of various interactive screen displays, initiate searches, identify matching assets, and view listings of assets.

21 Claims, 17 Drawing Sheets

SYSTEM AND METHOD FOR THE STORAGE AND ACCESS OF ELECTRONIC DATA IN A WEB-BASED COMPUTER SYSTEM

RELATED APPLICATIONS

This patent application relates to U.S. provisional patent application Ser. No. 60/162,643 filed on Nov. 1, 1999.

FIELD OF THE INVENTION

Described herein is a system and method organizing and storing electronic data such that it is accessible over a data network, and more particularly to storing and organizing the electronic data such that it and all related information stored in a database system are more easily accessible.

BACKGROUND OF THE INVENTION

As is well known, organizations such as corporations employ many internal processes and procedures for carrying out their business. For example, companies may set procedures for far ranging functions such as purchasing supplies, providing training, as well as the management of their business programs. In the situation where an organization is small and has a small number of employees, the use of processes and procedures may be less important. This is because parties involved are usually aware of what others are doing in the organization and the focus of the particular organization is quite narrow.

As an organization grows, and more and more people are employed and performing different tasks, it becomes more important that common processes and procedures be implemented. The reason for having common processes and procedures are many, but they mostly revolve around ensuring efficiency of the business and the avoidance of duplication of effort.

As such, it is commonplace for an organization to generate sets of policies and procedures which are to be used by most or all of the employees within a particular organization. Depending on the size of the organization, the institution of processes and procedures may be performed in a manner such that a set of governing procedures may be created for the entire organization while individual groups may generate their own processes which are more applicable to tasks and other functions which are unique to them.

One difficulty which may be encountered in establishing a governing set of policies and procedures is providing organization wide access to this information. Also, even if access is provided to these items it may still be difficult to assure that all members in the organization have access to deletions, additions, and updates of the processes and procedures.

One manner in which some organizations have provided organization wide access to their processes and procedures is to distribute these items in paper form to all employees which would be using said processes and procedures in their work. Periodically, additions, deletions, or updates may be issued in paper form which the employee would then use to manually update their copy. One drawback of this system is that the use of the most updated procedures by the employees is dependent on the individual employees updating their processes and procedures manuals in a timely fashion.

SUMMARY OF THE INVENTION

The inventors have recognized that providing a centralized location for the organization and accessing of policies and procedures may be advantageous in that these policies and procedures are easily updated and organized in a manner such that they have applicability to a large number of functions within the organization. In particular, in providing a centralized web-based computer tool, the policies and procedures can be organized in such a fashion that they may be searched in a number of different modes, and all related information may be easily accessed.

Described herein is a system and method for organizing assets and other related electronic information in a web-based computer system. According to the system and method described herein, at least one searchable database may be provided for storing assets and/or associated information where each record in the at least one database may have associated therewith at least one classification identifier which is searchable and may identify a particular asset and/or associated piece of information. Each asset or other associated information may also have links associated therewith to other records in the database such that when a search of the database is performed to identify assets and/or associated information, any relevant records in the database are also identified.

The system may further comprise a communications interface configurable for establishing lines of communication between system users and the system described herein over a data network. Some examples of the data networks which are employable to access the system described herein include the Internet, a local area network (LAN), and an intranet. In one configuration of the system described herein, when access is gained through the communications interface, a number of interactive screen displays may be presented such that a system user may navigate within the system and perform various search functions with regards to locating assets and/or other associated information.

In order to perform the searching function described above, the system may further include a search engine specially configured to search the records in the at least one database to locate records which include selected classification identifiers. Once the desired records are located, the search engine described herein is further configured to compile the search results into a predetermined format which is presentable to users which are connecting over the data network. One example of this compilation process includes compiling the results into HTML pages which are viewable by a system user through use of a standard web browser.

The system described herein may be configured to present a number of interactive screen displays which a system user may employ to navigate through the system and to initiate various search functions. Upon initial access to the system, the home page may be presented to the system user and through navigation buttons (hypertext links) included in the display, move to other specially configured screen displays. Once these other displays are accessed, information about specific assets and/or asset related information may be presented, and the system user may then initiate the various search and retrieve functions for records in the database.

In one configuration of the invention, the assets and associated information may relate to processes and procedures that an organization employs in carrying out various aspects of its business. Each asset which is stored in the database may be in the form of an electronic document which is viewable in word processing or imaging software. Asset information may include one or more classification identifiers which assist in locating particular assets or other items of asset information.

The processes and procedures and associated information may be classified such that some have applicability over the entire organization, and some have a lesser applicability, such as for only a business unit, or a particular work group. Further, certain assets may be classified as falling with a particular process area. In one example, processes and procedures may be classified within tiers. As such, the higher tier classification may mean that processes and procedures apply to the whole of an organization, and as the tiers get lower the application of the asset becomes more focused. When a particular process is generated and configured such that it is stored in the system described herein, a particular tier designation may be added to its classification identifier such that it is searchable in this manner.

As mentioned above, other classification identifiers which may be associated with assets, which include such things as the process area with which the process asset has application. Other examples of a classification identifier may be the organization within which the assets were created, identification number, and creation date.

In order to provide for a more controlled use of certain assets, particular assets may be given special designations. For example, assets may be identified within the system as being either certified, sample and/or draft. A sample asset may relate to a certain number of processes and procedures which are put out to other groups within an organization as a sample of a particular way to perform tasks. Certified assets may relate to particular processes or procedures which have applicability across the organization which the organization has designated as a standard for performing a particular task. With regards to draft assets, before an asset may be implemented as policy, it may need to go through various review stages and through the system described herein, it may be made accessible at its various stages of development to various parties.

One additional way in which the assets and associated documentation described herein may be accessible is through inclusion of links for the various assets and related information as part of a process maturity road map for performing a particular task. Included in the system described herein may be a number of interactive screen displays which assist a system user in carrying out a long term task such as running a project or a program. As the various interactive screen displays provide direction as to how to carry out the tasks, links to various assets may be included such that they are easily accessible.

The information associated with the assets, which is also stored in the database, may include such items as change directives and change requests specifically related to one or more processes. As a particular procedure or process is employed in an organization, its use may evolve over time. A mechanism may be needed to implement changes in the particular processes or procedures. As such, change requests may be created and monitored as part of the system described herein. Change directives which spring from change requests may also be included. Through identification information included with a change request, a system user may be able to monitor its approval and implementation in a process asset.

DETAILED DESCRIPTION

Figure 1:
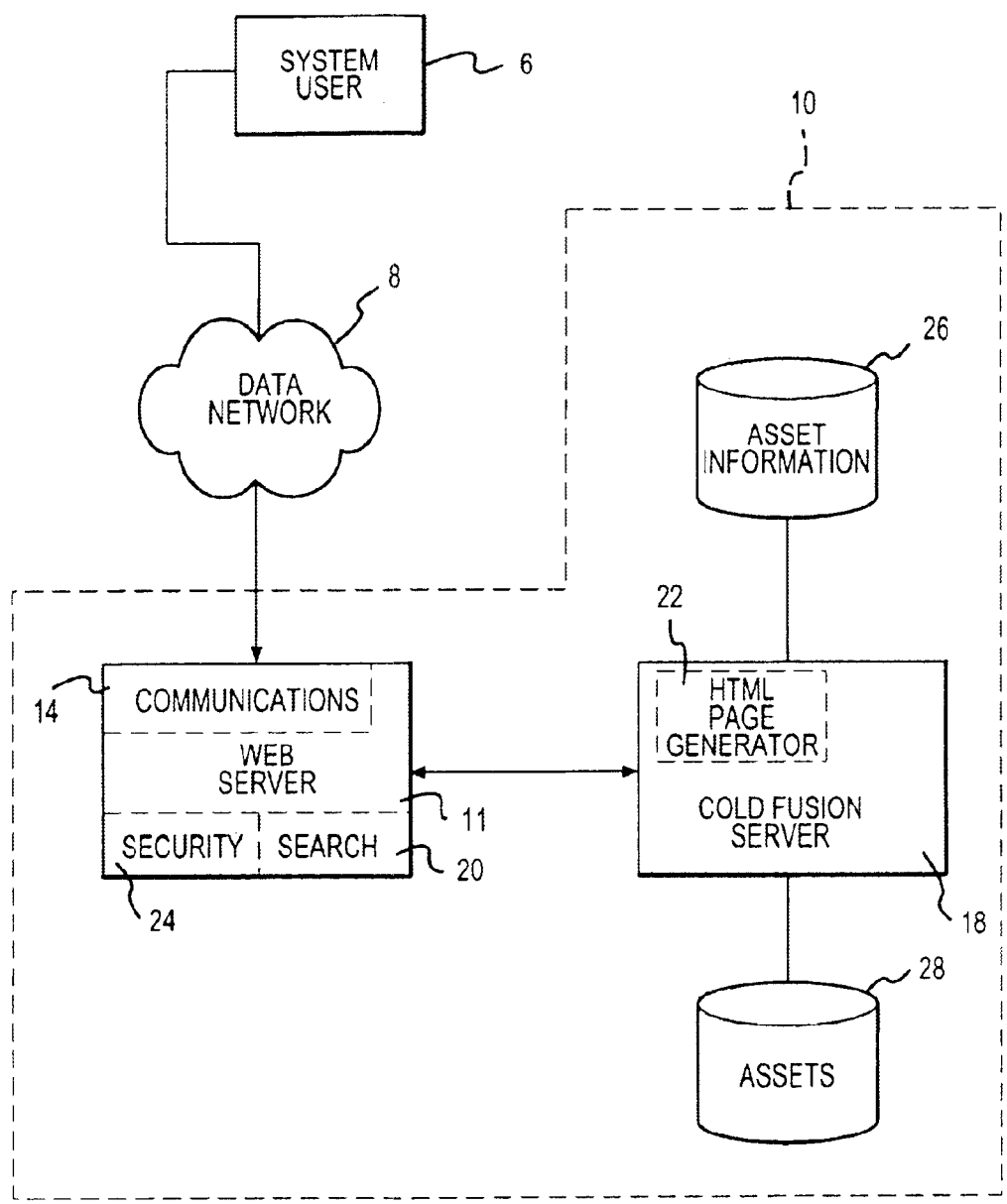
FIG. 1 discloses a system diagram for the web based electronic data system described herein.

Disclosed in FIG. 1 is a system diagram for the electronic data storage and access system described herein. In the configuration shown in FIG. 1, the system 10 is web-based in that it is accessible via a number of different types of data networks 8 which include, but are not limited to, the Internet, an organization's intranet or a local area network (LAN). The system 10 described herein may be implemented on one or more network servers, using any number of platforms such as Unix or NT. In another configuration of the invention, which is described in greater detail below, the present system may be implemented simply on a personal computer.

For illustration purposes the system 10 is shown to include two servers, the web server 11 and the cold fusion server 18. One skilled in the art would realize that the functions performed by the two servers may be performed on the same physical hardware. Included in each of the servers are a number of processing components which are specially configured to perform tasks with regards to communicating with system users over the data network, searching and extracting information from the various databases, and/or formatting the extracted information for viewing.

Included in the web server 11 is a communications interface 14 which provides for establishing a data connection between the system 10 and a system user 6 over the data network 8. The interface 20 may be configured such that a system user may navigate within the system 10 using a commercial web browser. Further included web server 11 is search engine 20 which is configured to initiate search requests entered by system users which in turn are provided to the cold fusion server 22 for further processing. Finally, the web server 11 may include a security module 24 which is employable for limiting access to selected information in the databases: The operation of the various components of the web server 11 will be described in greater detail below.

In communication with the web server 11 is the Cold Fusion server 22. In one configuration of the system described herein, Cold Fusion software from Allaire may be employed to receive search requests from the web server 1, perform the searches of the associated database, extract the information, compile in a desired format, and provide it to the web server 11 for presentation. Although Cold Fusion is described herein for use with system, one skilled in the art would realize that other types of software such as Active Server Pages by Microsoft may be configured and employed. Incorporated into the cold fusion server 18 is HTML page generator 22 which is employable to convert data extracted from one or more databases into interactive an HTML pages (some of which may include hypertext links) which in turn are provided to the web server 11.

In connection with the Cold Fusion server 18 are an asset information database 26 and an asset database 28. Stored in these databases are searchable entries for assets and asset information. More specifically, the asset database 28 may be configured to contain various documents which comprise the assets. The asset information database 26 may contain various types of descriptive information relating to the assets stored in database 28. Although both databases are shown as resident in the system 10, in other configurations of the invention, the databases, or information contained in the databases, may be distributed in remote locations and accessible over the data network. The configuration and content of these databases will be described in greater detail below.

If the system described herein is to be configured on a personal computer, the hard drive may be configured to include one or more relational databases which include the assets and asset information. Further, the personal computer may be configured such that a number of the screens which are to be presented to a system user are stored in the database as flat files which are presentable upon selection of particular items by a system user.

Returning again to system 10 as is disclosed in FIG. 1, the databases described herein may comprise any number of different types of relational databases. Examples of these types of databases may include Oracle, Microsoft Access, ... etc. Alternatively, the databases described herein may be configured to store assets and asset information in flat files which in turn are accessible and presentable to system users.

Generally, the system described herein is an asset library which is an online centralized repository for various process and procedures as well as related information. The assets themselves may be electronic documents created in a word processing (such as Microsoft Word, WordPerfect, ...) and/or image (Adobe Acrobat, ...) software. Associated information may also be stored in the system which provide assistance in either accessing or determining the status of the asset. Because the system is web-based, it allows for easy access (it may be accessed using a standard web browser). The kinds of information which may be accessed and viewed through the system described herein may include electronic documents, templates, charts, schedules and other readable files.

Figure 2:
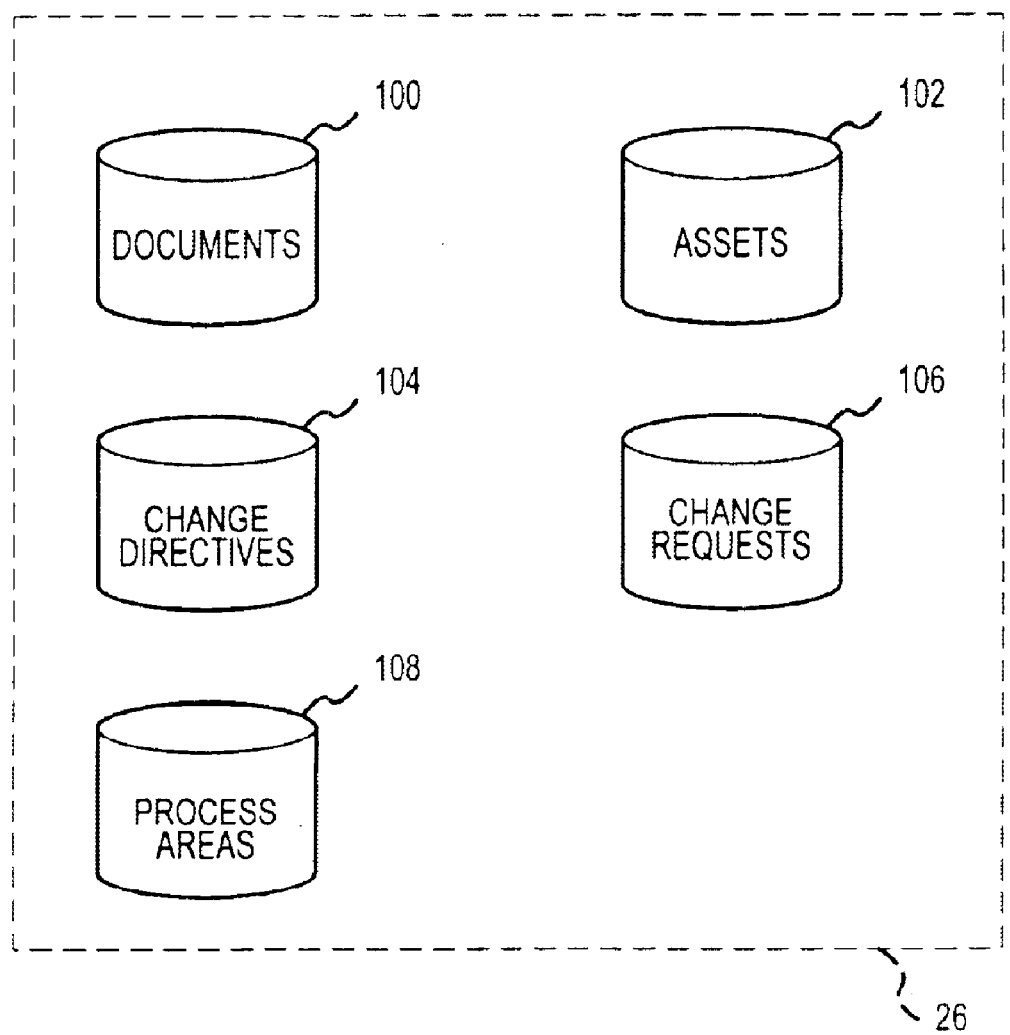
FIG. 2 discloses a diagram which shows an example structure for the asset information database.

Before the operation of the system is further discussed, a more specific description is provided as to the types of data which are accessible in the system described herein. Disclosed in FIG. 2 is diagram which provides a framework for the types of information which are included in the asset information database 26. This diagram is merely for illustrative purposes because the database may be configured such that different types of information may be stored in one or more different tables. In asset information database 26 it can be seen that separate tables are provided for electronic documents 100, assets 102, change directives 104, change requests 106, and process areas 108. In short, the electronic documents table 100 provides information for accessing the assets in document form. The assets table 102 includes descriptive and identifying information for assets. Change requests table 106 includes information relating to proposed changes to assets. Change directives table 104 includes information generated in response to change requests, and provide specific information as to changes to be made to one or more assets. Process areas table 108 includes information for the various process areas (such as engineering, business or support operations) to which each of the assets is assigned.

Figure 3A:
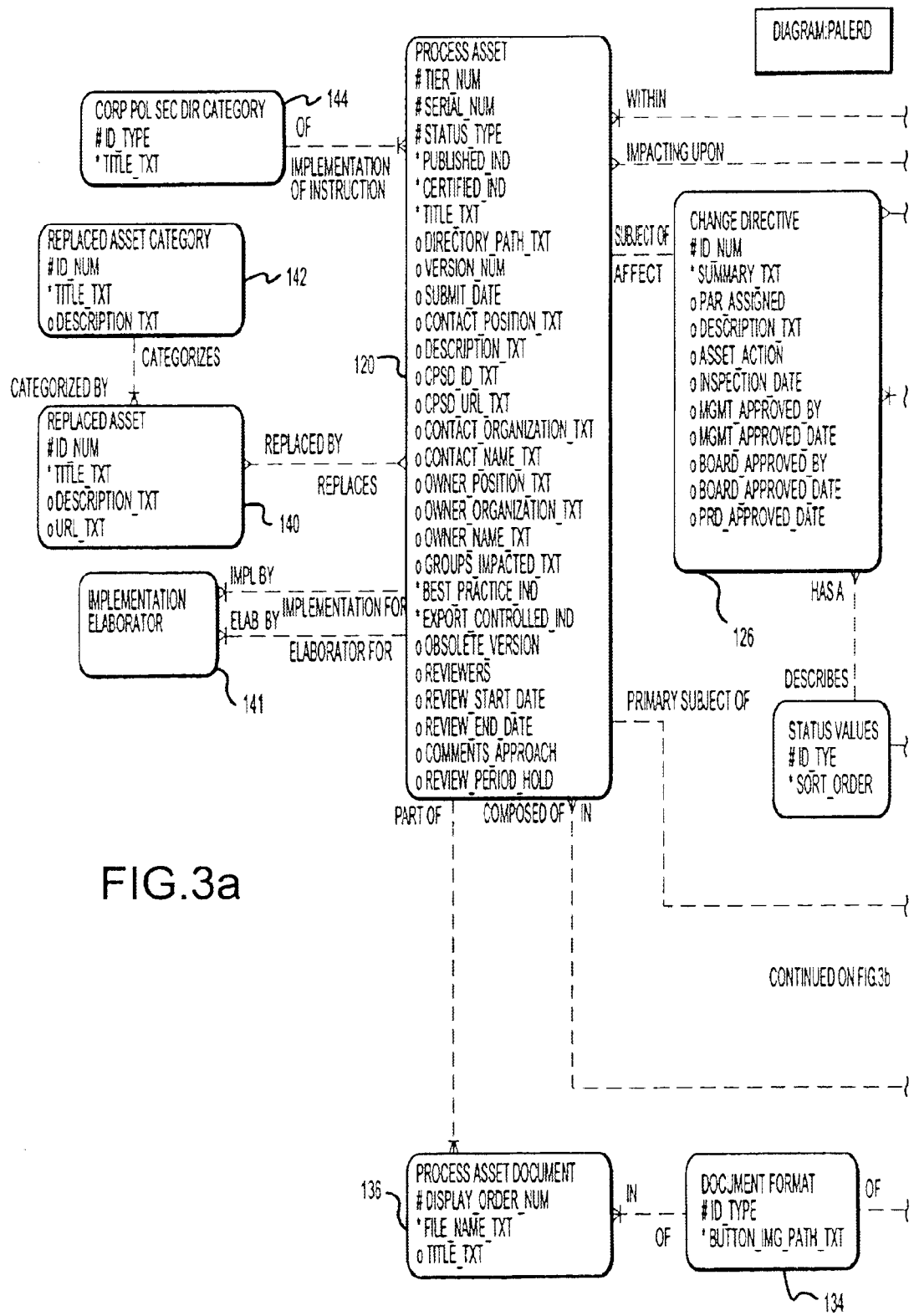
FIGS. 3a and b disclose a database diagram which shows the classification identifiers associated with particular records as well as links established between the different records.
Figure 3B:
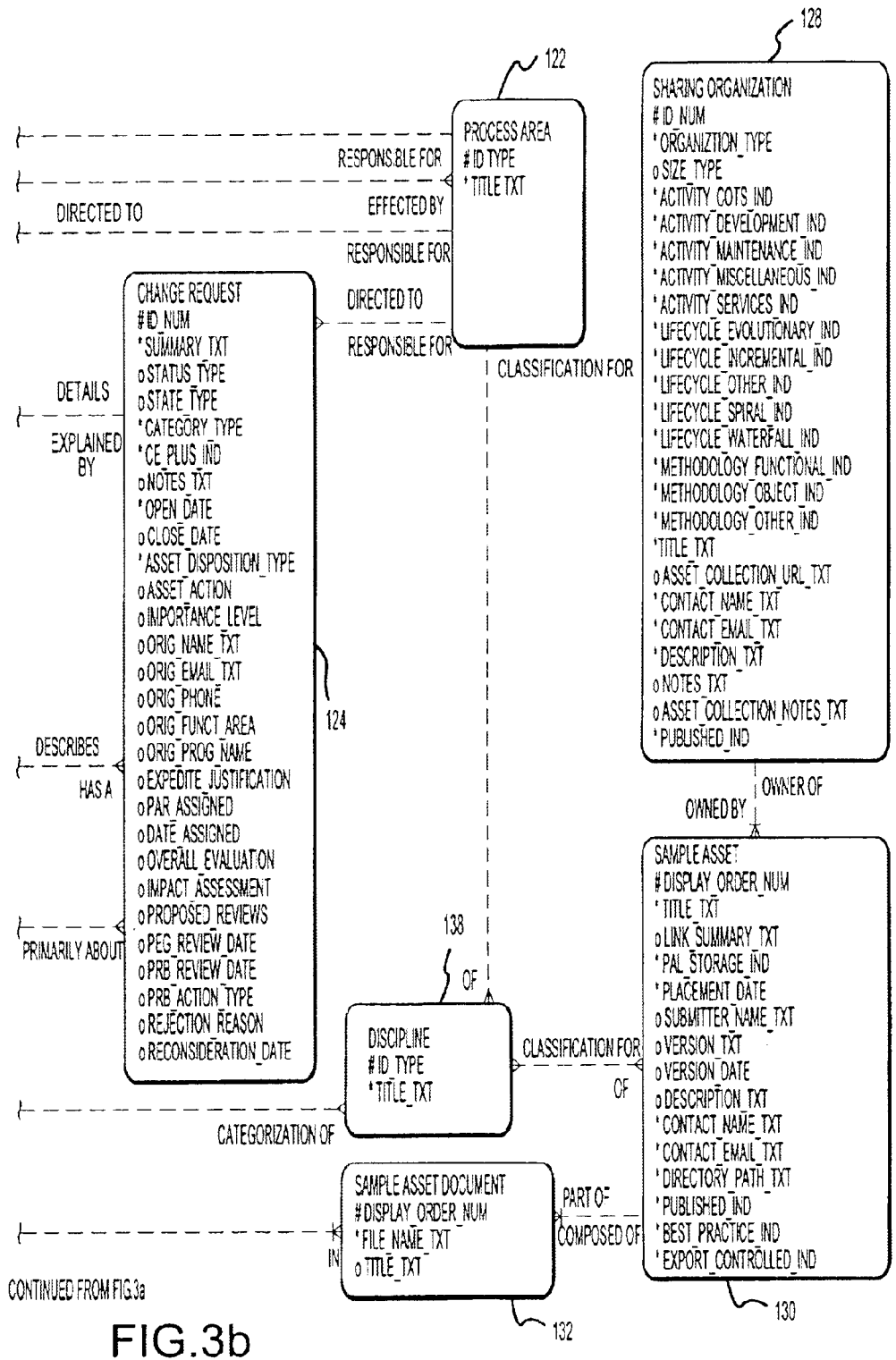

Disclosed in FIGS. 3a and b is a database diagram for database 26 which shows in particular the associations which may exist between the various records in the different tables included in database 26. The association shown therein provide for the simplified searching of assets because it removes the necessity of storing a particular piece of information in more than one database. Further by creating records which include associations with one or more other records, the flexibility is provided such that a particular piece of asset information or an asset may be identified through employing a number of different search methods.

Also shown in FIGS. 3a and b are examples of the descriptive information (classification identifiers) which are associated with each type of record. As part of a relational database, each of the records in the various tables is searchable by employing the search engine 20 incorporated in web server 11 to search for one or more classification identifiers. Identified records may then be retrieved, converted to a desired format, and presented to system users. Some of the classification information associated with each record may either be displayed or not displayed. For example, with regards to the descriptive information included with a record in the process asset table 120, the records may comprise identifiers such as a tier number, serial number, status type, etc.

Referring again to the diagram of FIGS. 3a and b, in order to better understand the associations between the various types of records, relationship lines with descriptive information have been provided. Specifically, the data structure described herein is hierarchal in nature and the relation lines provide an indication of which records, either alone or with others, are apart of another record. In reviewing the diagram it is seen that one or more of the process assets 120 may be an implementation of an instruction in a corporate policy category 124. In turn, one or more of the process assets 120 may be within in process area 122. It can be seen that a process asset may also impact upon a process area 122, while a process area 122 may be responsible for a process asset 120.

In FIGS. 3a and b, it is further seen that one or more of the change requests 124 are primarily about a particular process asset 120. In actuality, change requests may be forms or other documentation submitted by system users which have the effect of modifying or otherwise changing a particular process asset. Before this change is implemented in a particular process asset, the change request may be accessed and viewed as a piece of information associated with a particular process asset. Continuing, one or more change directives 126 may include details which are explained by a change request 124, and one or more change directives may affect a process asset. Finally with regards to the change directives 126 and change request 124, one or more of both may be directed to a process area 122.

Referring back to process asset 120, it is seen that it may be composed of one or more process asset documents 136. The descriptive information included in the process asset document 136 provide for locating the actual asset (electronic document) in database 28. In order to provide some flexibility in viewing the asset document, the process asset document 116 may be created in one or more document or image formats 134. As described above, a document format is in some kind of word processing or imaging software.

Further shown in the diagram of FIGS. 3a and b is the relationship between process asset 120 and any assets 140 which it replaces. As time goes on, certain process assets lose their applicability to a particular organization and must be replaced. As such, certain assets may be introduced to replace them. In order to provide continuity, it may be desirable to retain the replaced assets 140 in a database such that they may be referenced if necessary. Each of the replaced assets is in turn associated with a particular category 142. Also, one or more implementation elaborators 141 may provide for implementation and elaboration of a process asset 120.

Still continuing in the review of FIGS. 3a and b, it is seen that records are included for sample assets 130 and one or more of the sample assets is owned by a sharing organization 128. Sample assets are those assets which have been provided by a particular segment of an organization for optional use across the organization. Sample assets may further include certified assets which have been certified by a particular organization as being compliant with an approved set of standards and practices. It is seen that the sample assets 130 also are composed of one or more sample documents 132. As with the process asset document 136, this record includes identifying information for locating one or more documents in asset database 28. As was mentioned above, these electronic documents are available for viewing in a number of formats.

Figure 4:
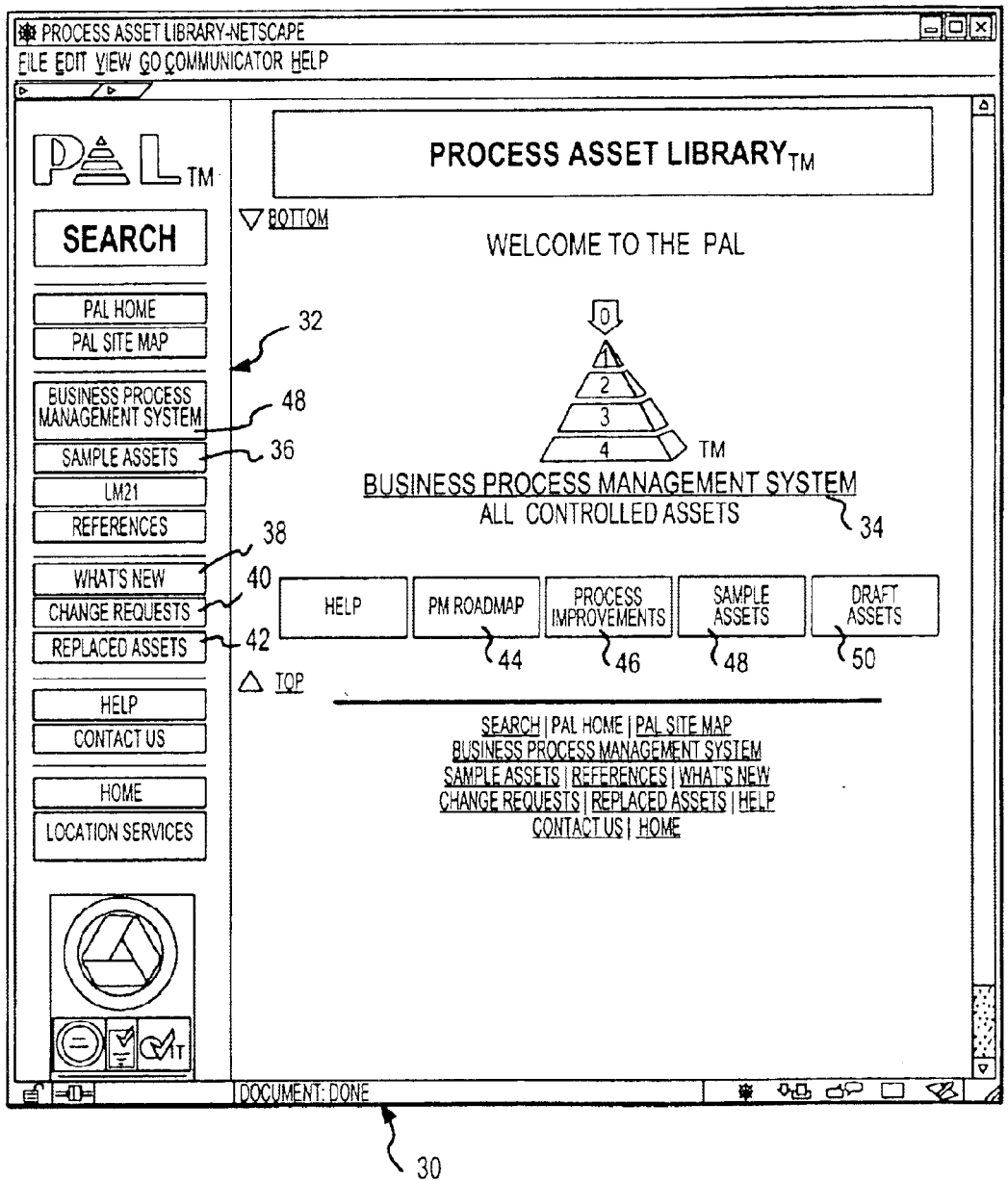
FIG. 4 discloses a home page interactive screen display which is employable to navigate to various functions of the system described herein.

As was mentioned above, the system 10 described herein is accessible over a data network, such as the Internet, through use of a personal computer equipped with a webbrowser. Upon gaining access to the system, various interactive screen displays may be accessed such that the system user may navigate within the system. Disclosed in FIG. 4 is a "home" interactive screen display 30 which may be presentable to a system user when access is initially gained to the system described herein. This screen display may provide the portal for the system user to gain access to any number of "areas" within the system where desired information may be accessed. Navigation to these "other" areas may be gained through the selection of the various navigation buttons, such as hypertext links, included in the screen displays.

As can be seen in display 30, navigation buttons are provided for access to the business process management system 34, the process improvements 46, the sample assets 48, the draft assets 50, as well as the road map 44. Also included in this home page may be a side bar 32 which includes a number of selectable navigation buttons for accessing additional areas. These include the best practices area 33, change requests 40 and replaced assets 42.

Figure 5A:
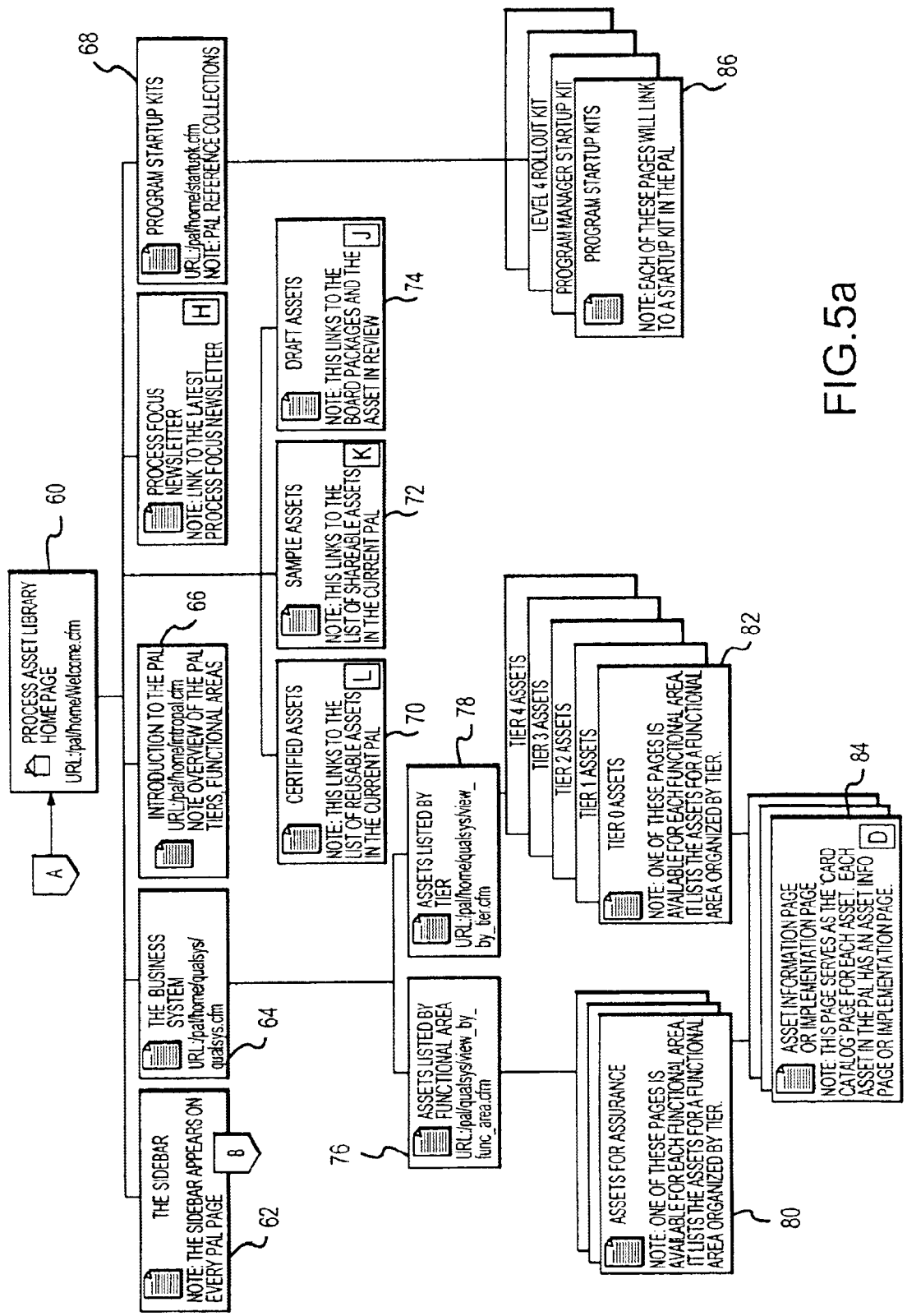
FIGS. 5a and 5b disclose a diagram which display the links between the various interactive screen displays.

To better understand the process of navigating through the system described herein, disclosed in FIGS. 5a and b is a diagram which discloses the various interconnections between the interactive screen displays presentable by the system described herein. As was seen in FIG. 4, a number of hypertext links are included on the home page which provide for accessing various other pages within the system. Most of the selectable links provide for accessing other displays, where the other displays mostly provide for performing various search of the database to locate assets and associated information. The diagram in FIGS. 5a and b show the trail of links which may be followed when accessing different areas of the system described herein.

Returning again to FIG. 5a, a link is provided on the homepage for viewing business system page 64. With access to this page, various additional choices may be provided with regards to the viewing of assets stored within the database. As can be seen, links 76 and 78 provide for searching assets by functional area 76 or listed by tier 78. Through links 76 and 78, links 80 and 82 may be accessed. Link 80 contains a descriptive listing of each of the assets within a functional area. Link 82 contains individual pages for each tier, where the assets which have been categorized in a particular tier are listed therein.

Figure 6:
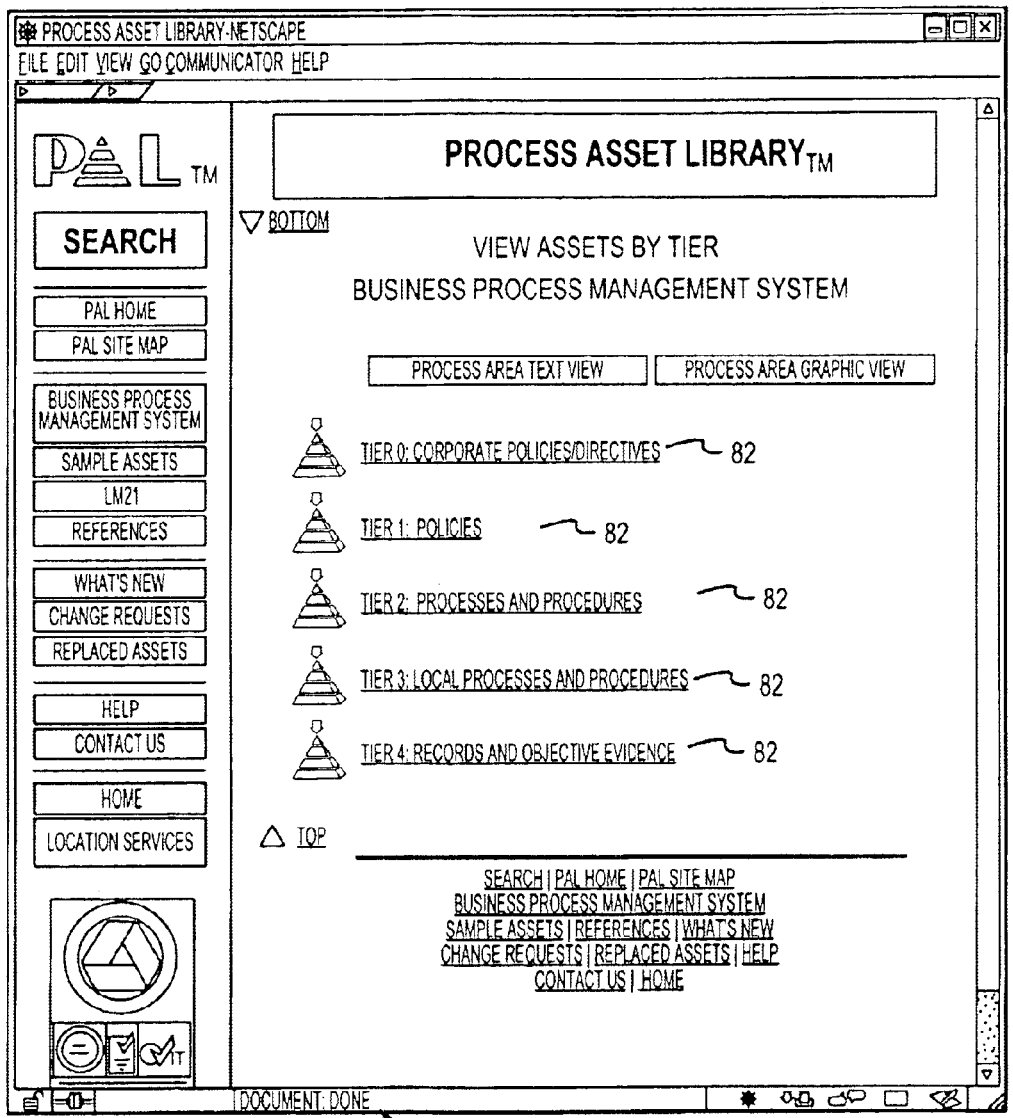
FIG. 6 discloses a screen display employable to view assets when they are categorized by Tier.

Disclosed in FIG. 6 is an interactive screen display 150 which is presented when link 78 is selected. Included in this screen display are a number of links 82 which when selected provide for the searching of the database in order to locate process assets which have been categorized according to a tiered structure. In the system described herein, a tiered categorization structure has been implemented which itemizes process assets according to their applicability to parts of the organization. Tier 0 has been designated to contain organization policy statements issued at levels higher than the organization which controls the system described herein. Tier 1 has been designated to include policy documents which apply to the particular business unit which controls the system. They may apply across all locations within a business unit.

Tier 2 assets may include various business unit processes and procedures which apply across a particular business unit level. In most cases, these assets may include implementations of or supporting documentation for Tier 0 or Tier 1 assets. Tier 3 assets may be those which do not apply across a particular business unit as a whole, but rather to a particular subset within a business unit, such as a specific location or program. Tier 3 assets may be only selectively added to the system and may be subject to security restrictions. An example of a Tier 3 asset may include a program configuration management process or a desk procedure for a security manager. Certain security limitations may be placed on a Tier 3 asset such that they are not accessible by all parties which have access to the system.

Finally, Tier 4 assets may be configured to include information for an organization which otherwise would not be classifiable in another one of the tiers, for example, objective evidence of following a process. Further, this tier may also include external links for accessing locations which may have desired information, for example, links to program web sites containing objective evidence or other records.

In order to view one or more of the assets which fall within a particular tier, the link for the particular tier may be selected and as such a search may then be performed within the database to locate all process assets which are included within a particular categorization. As was described above, each asset stored in the database includes a listing of at least one classification identifier (within which tier designations are found) which is searchable when employing whatever database search engine is provided.

In order to perform a search, as an initial step, the user may select a particular link from the screen display indicating the particular tier within which the process assets are to be located. In the situation where the tier selected has limited accessibility, only selected system users, a security module may be employed to perform a check to determine if the particular system user has permission to access this information and to deny access if necessary. As an example, tiers 0, 1 and 2 may have applicability to the whole organization, and thus no access limitations exist, while tiers 3 and 4 have limited application to the organization, and as such only users who are affiliated with a particular business unit may retrieve these assets. In the situation where tiers 0, 1 and 2 have been selected, the system will generate the search query and begin the search. In the situation where either tiers 3 or 4 are selected, the system will perform a check as to whether the particular user has permission to access these assets. If the user does not have permission, the process will end and an error message may be displayed. If the user does have permission, a search query will be generated and the search is begun. The security module described herein may be configured such that access is limited to assets and asset information based on any number of classification identifiers included in the particular record.

Once the search query is generated, a search is performed of all records in the asset information database to locate those assets which have the selected tier as part of their classification identifiers. All assets which are identified as falling within a selected tier will be compiled and an HTML page generated which includes a listing of these process assets.

Figure 7:
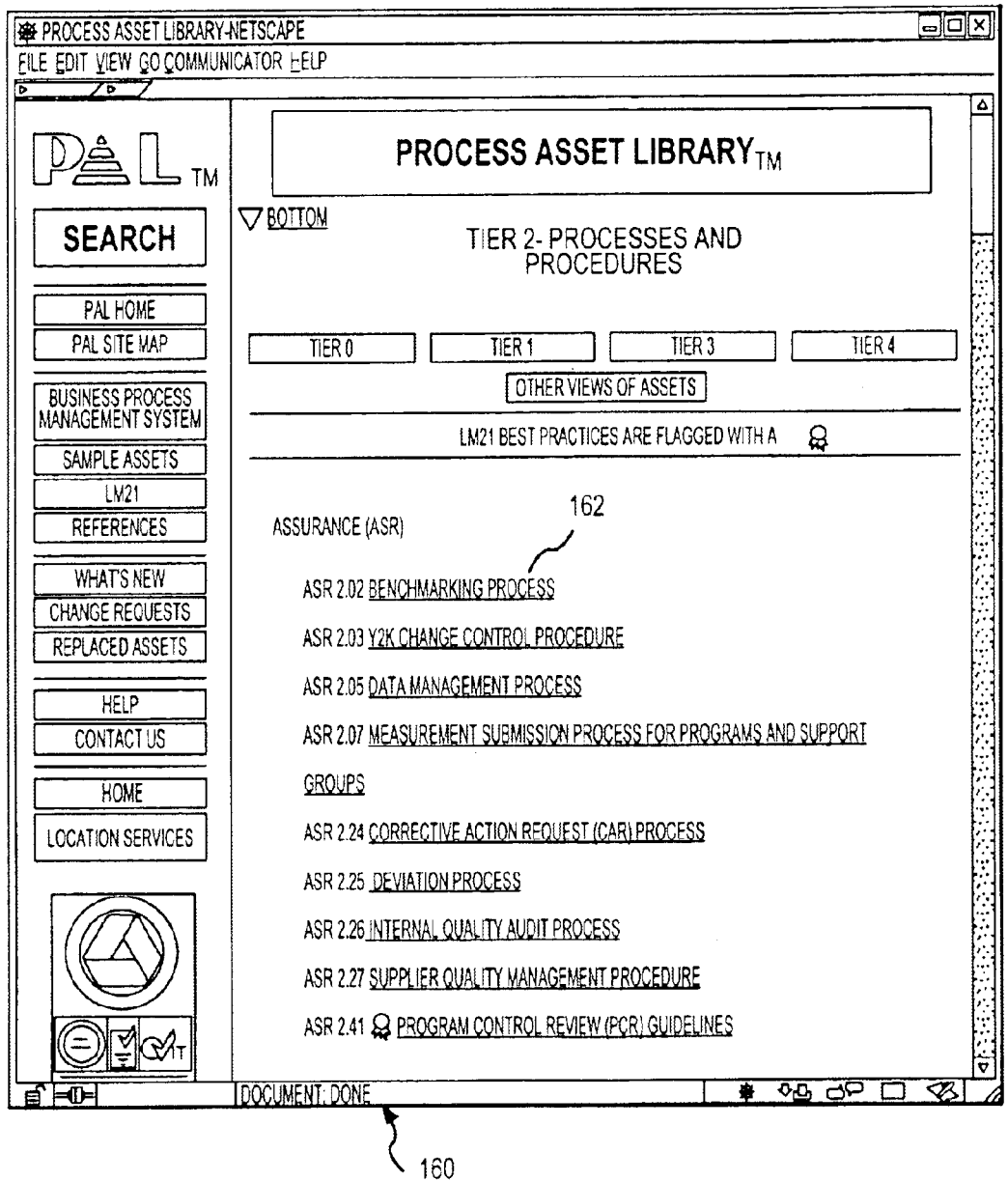
FIG. 7 discloses a screen display which includes a listing of process assets located in search within a selected tier.
Figure 8:
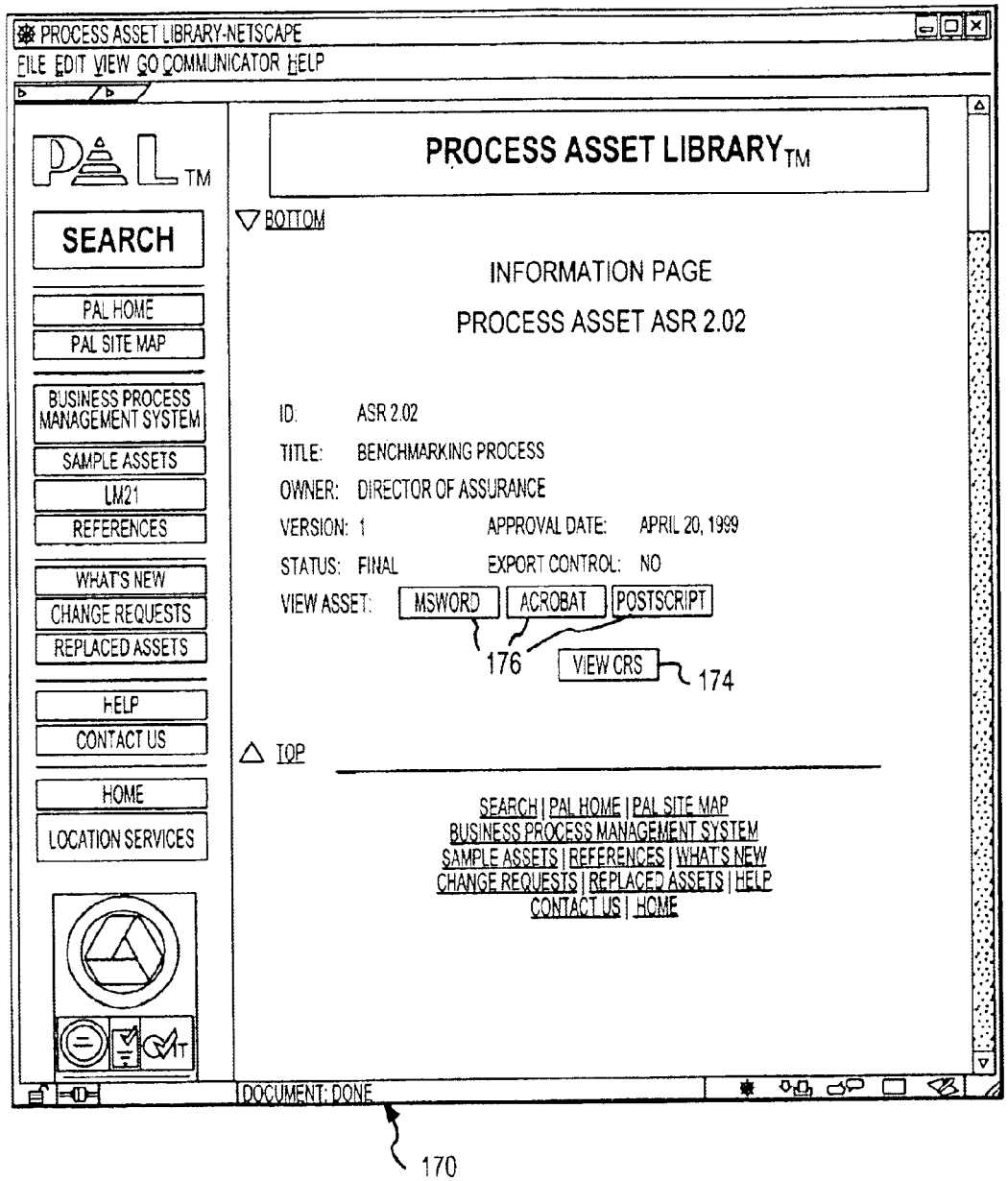
FIG. 8 discloses a screen display which provides information as to a selected process asset.

An example of such a page is screen display 160 shown in FIG. 7 which includes compilation of identified process assets. In this example, a listing is provided of the process assets which include "tier 2" as a classification identifier. In particular, the listing includes a number of links for accessing descriptive information about particular assets which falls within the tier. As an example, if the hypertext link 162 is selected (for benchmarking) from this page, an information page for the particular process asset is presented. An example of such an interactive screen display is disclosed in FIG. 8.

In screen display 170 an informational portion 172 is provided which includes selected portions of the identification information associated with the process asset. Also included in this portion of the screen display are a number of links 176 which when selected provide for the display of the electronic document associated with the process asset in a desired format, shown here to be either MS Word, Adobe Acrobat, or Postscript. As was described above, within the electronic document is the descriptive portion of the process or procedure.

Figure 9:
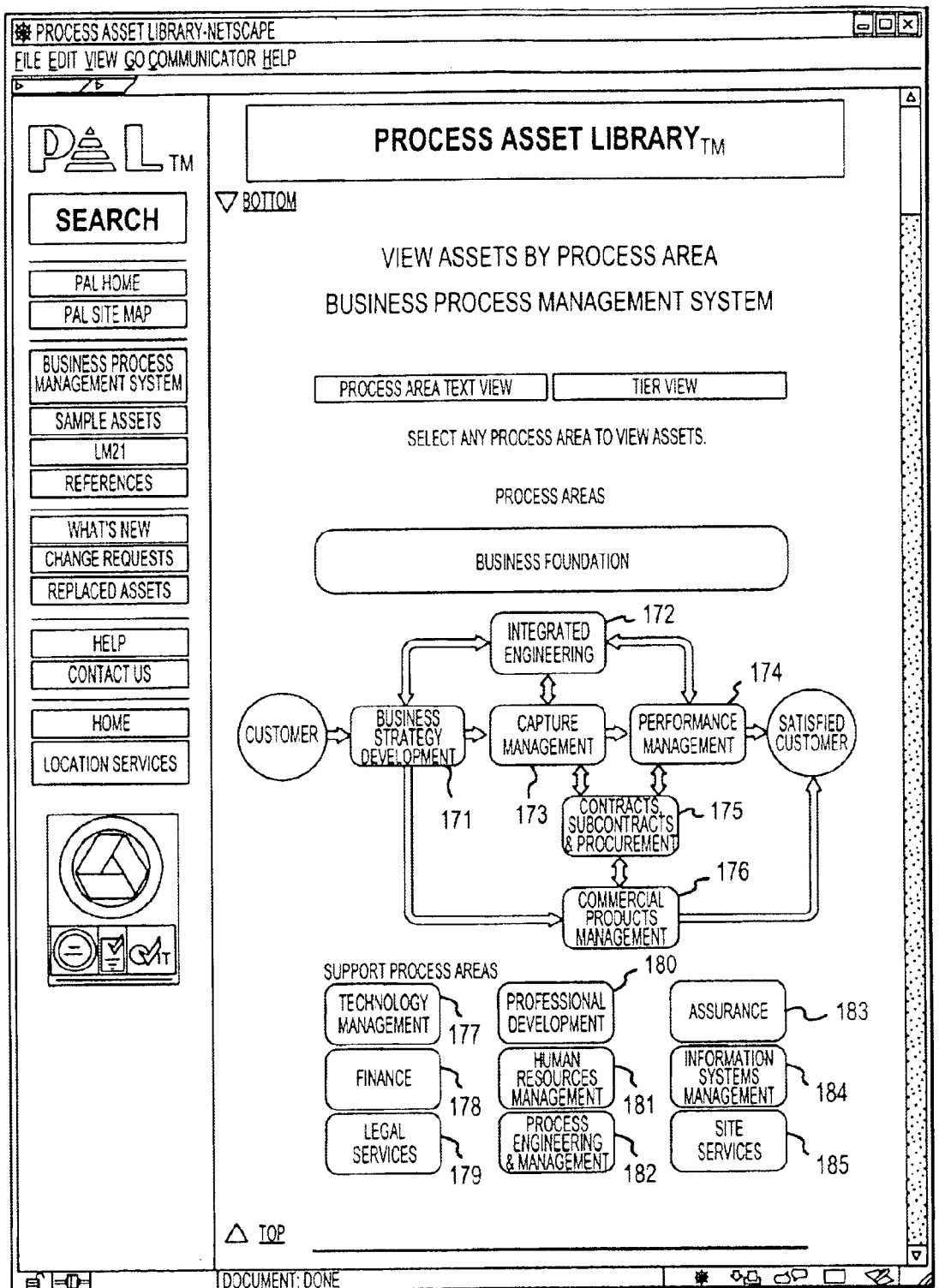
FIG. 9 discloses a graphical screen display employable for accessing assets within a particular process area.

Returning again to the diagram of FIG. 5a, another search mode may be employed through the selection of link 76. According to this selection, process assets may be searched and displayed according to functional area. Disclosed in FIG. 9 is an example of a graphical screen display 170 which is presented when this option is selected. A textual screen display which includes a listing of all the process areas may also be presented if that option is selected. Returning again to FIG. 10, it can be seen that a number of hypertext links 171–176 are presented which include textual descriptive information for the particular process areas, such as integrated engineering, business strategy development, capture management, etc. Other links 177–185 may be presented for various support areas.

Once a system user selects a particular process area, the system will initiate a search and identify process assets which are included within the particular process area. As assets are identified, a security check may be performed to determine if the particular system user who is performing the test has permission to access the particular asset. If the system user does not have permission, the asset is not included in the compiled list. Once all assets and related information have been identified within a particular process area, the system will compile the listing of the assets in a desired order and in HTML format, and then presented it as an interactive screen display.

Figure 10:
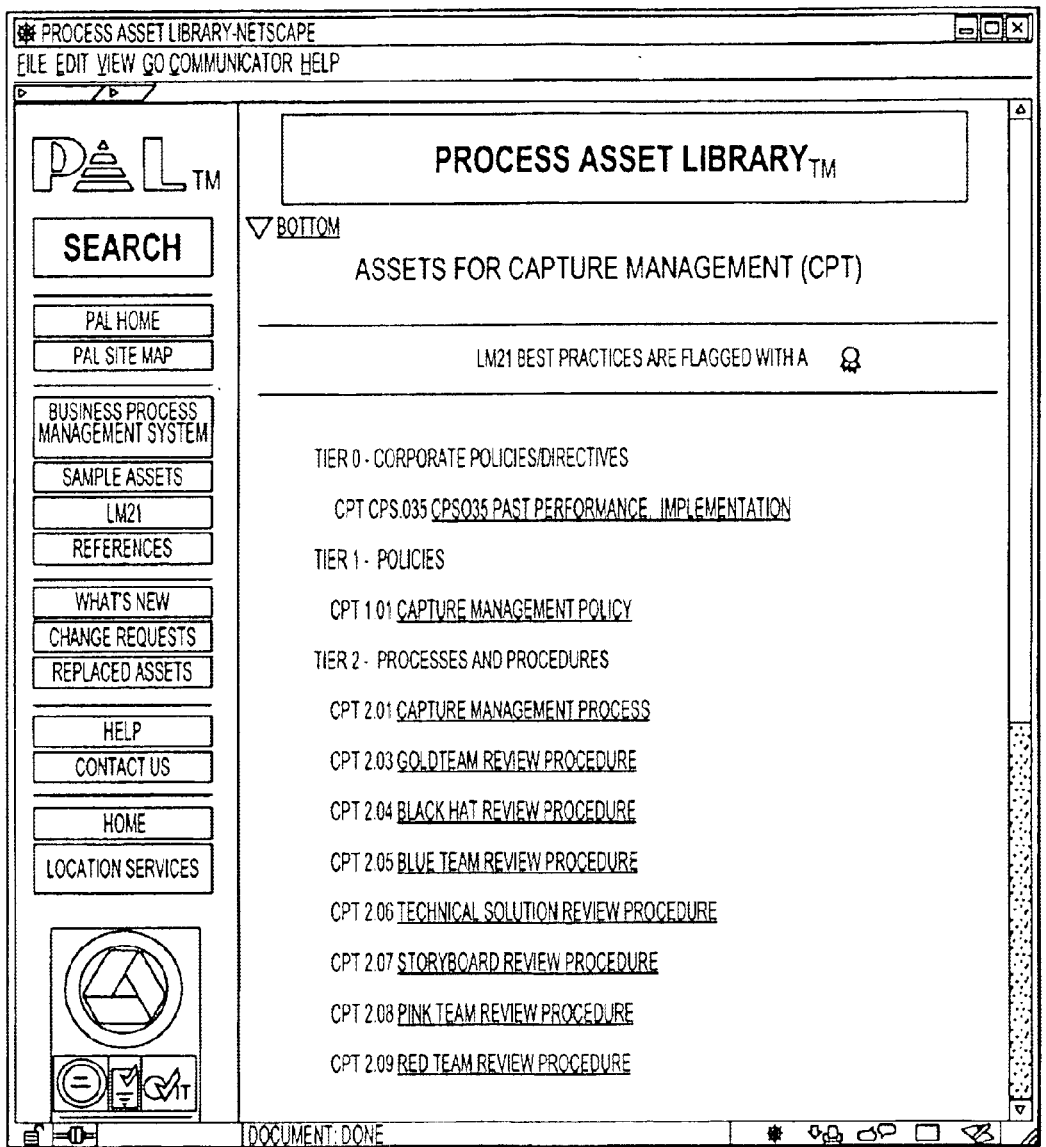
FIG. 10 discloses a listing of process assets within a particular process area.

An example of such a screen display 180 is presented in FIG. 10. To access this screen, link 173 in screen 170 was selected. Displayed are the assets for the Capture Management process listed according to the tier they have been classified. Each asset is displayed as a hypertext link which may be selected so that additional information may be viewed. As with the selection and viewing of process assets in the tiered search, when an individual listing of an asset is selected, and an information page is presented for the particular asset. Any electronic documents may then be opened and viewed in a preferred document or image format.

Functionality may also be included in the system for providing a listing of all the process assets stored in the database in a desired format. This format may include organizing the process assets numerically, alphabetically, or a combination of both. Additional information may be included in the listing such as process area and tier within which each of the process assets is classified.

Returning again to the home page disclosed in FIG. 4 and the diagram of FIGS. 5a and b, it is seen that a number of other functions are selectable for accessing and viewing assets and information related to assets. One selection which may be made through the interface disclosed in FIG. 4 is to view assets which have been classified as either sample or draft. As was described above, sample assets may be divided into two subsections, certified and sample. The certified assets are those which have been certified by a particular organization as being compliant with an approved set of standards and practices. Sample assets contain examples of process assets that have been contributed by individual programs or groups within the organization and provide for optional use across the organization. These assets may be accessed by users and may be tailored for the user's own use. Finally, a draft asset section may be accessed wherein the draft assets are assets which are in the draft or review stage. As with the assets described above with regards to viewing either through the tiered structure or the process area, a further term may be included in the identification information for an asset which designates as either a certified, sample or draft asset.

Figure 11:
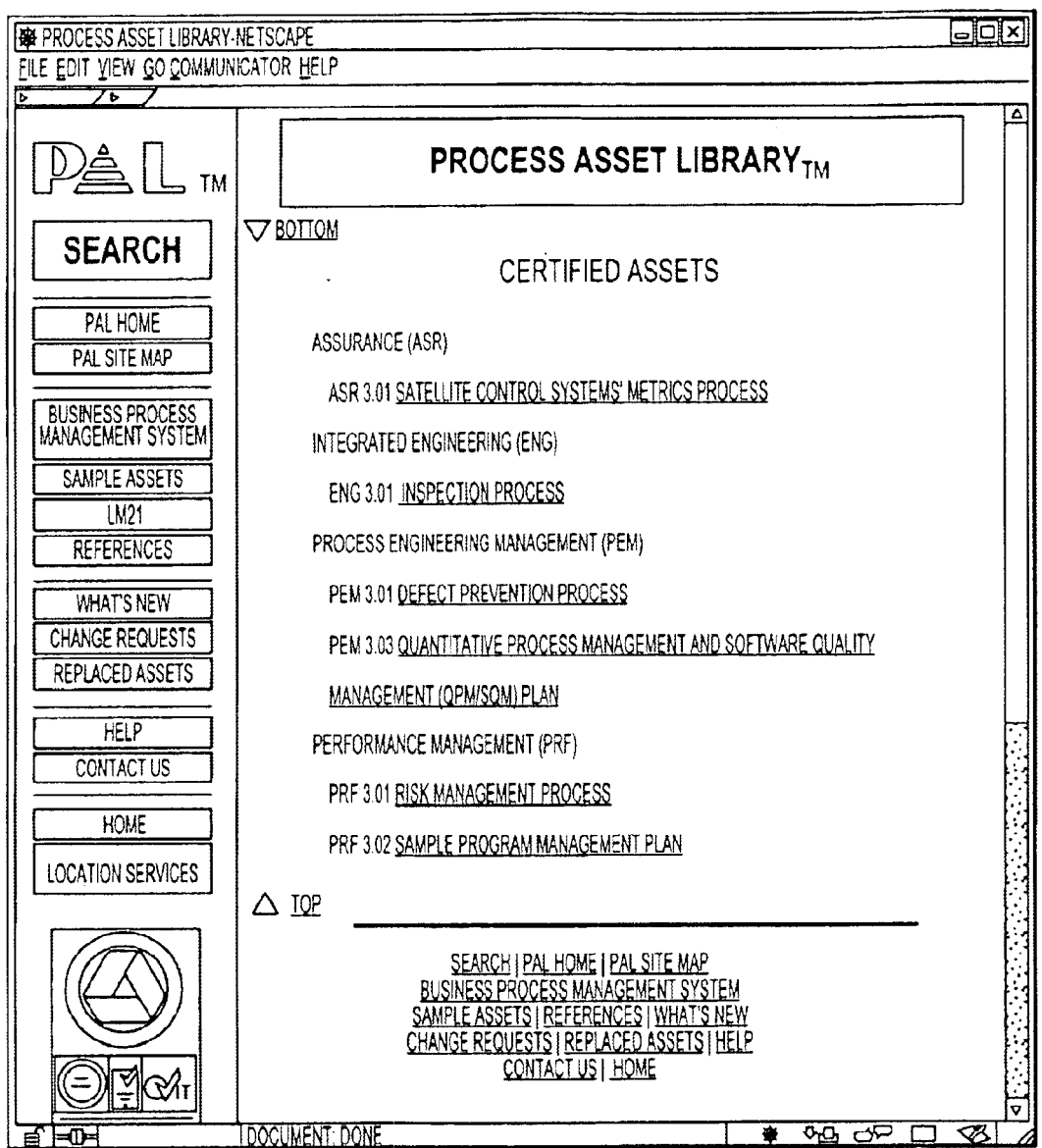
FIG. 11 discloses a screen display employable for viewing assets within process areas which have been certified.
Figure 12:
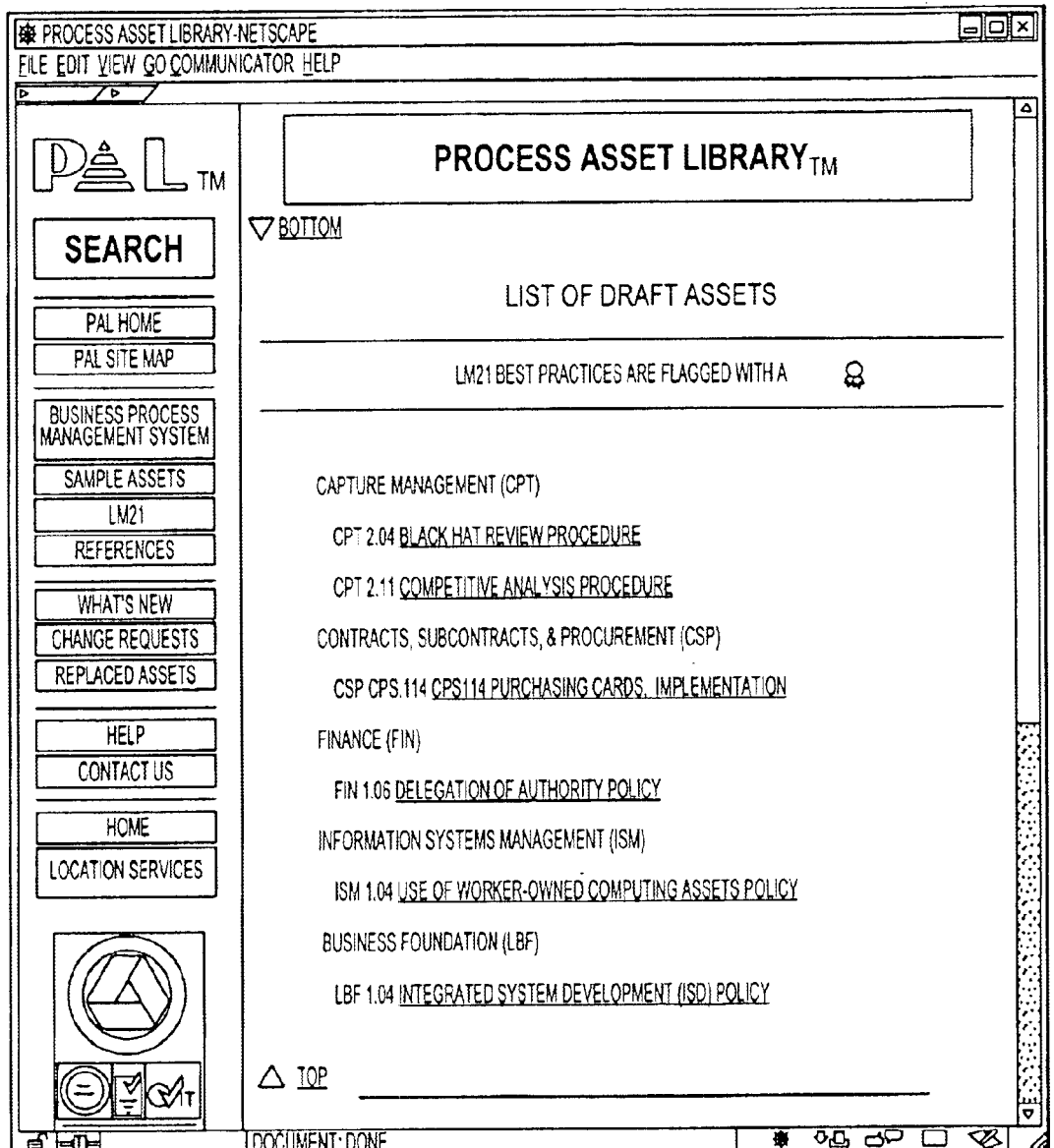
FIG. 12 discloses a screen display employable to select assets which are in the draft stage.
Figure 13:
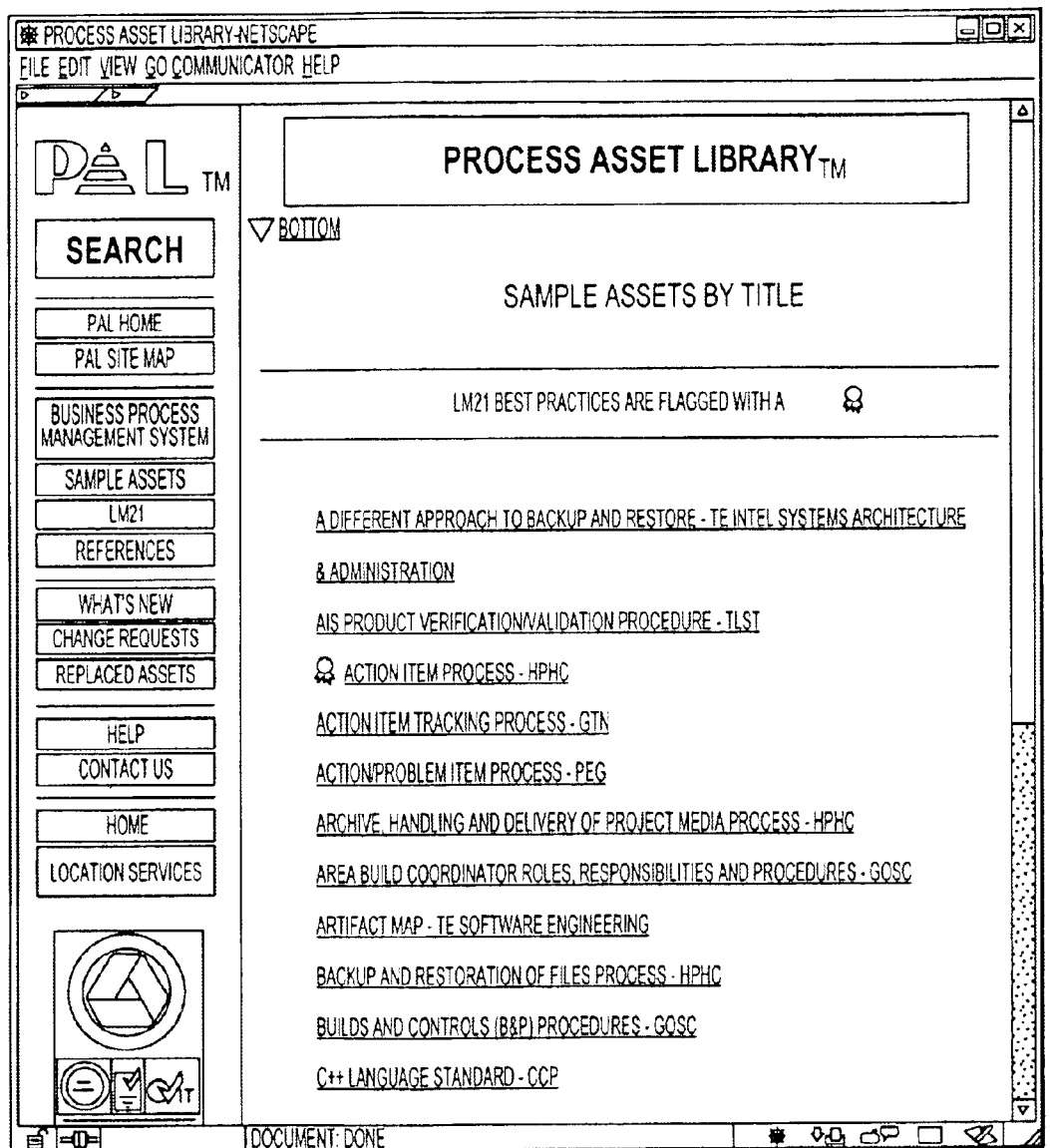
FIG. 13 discloses a screen display which is employable to identify sample assets.
Figure 14:
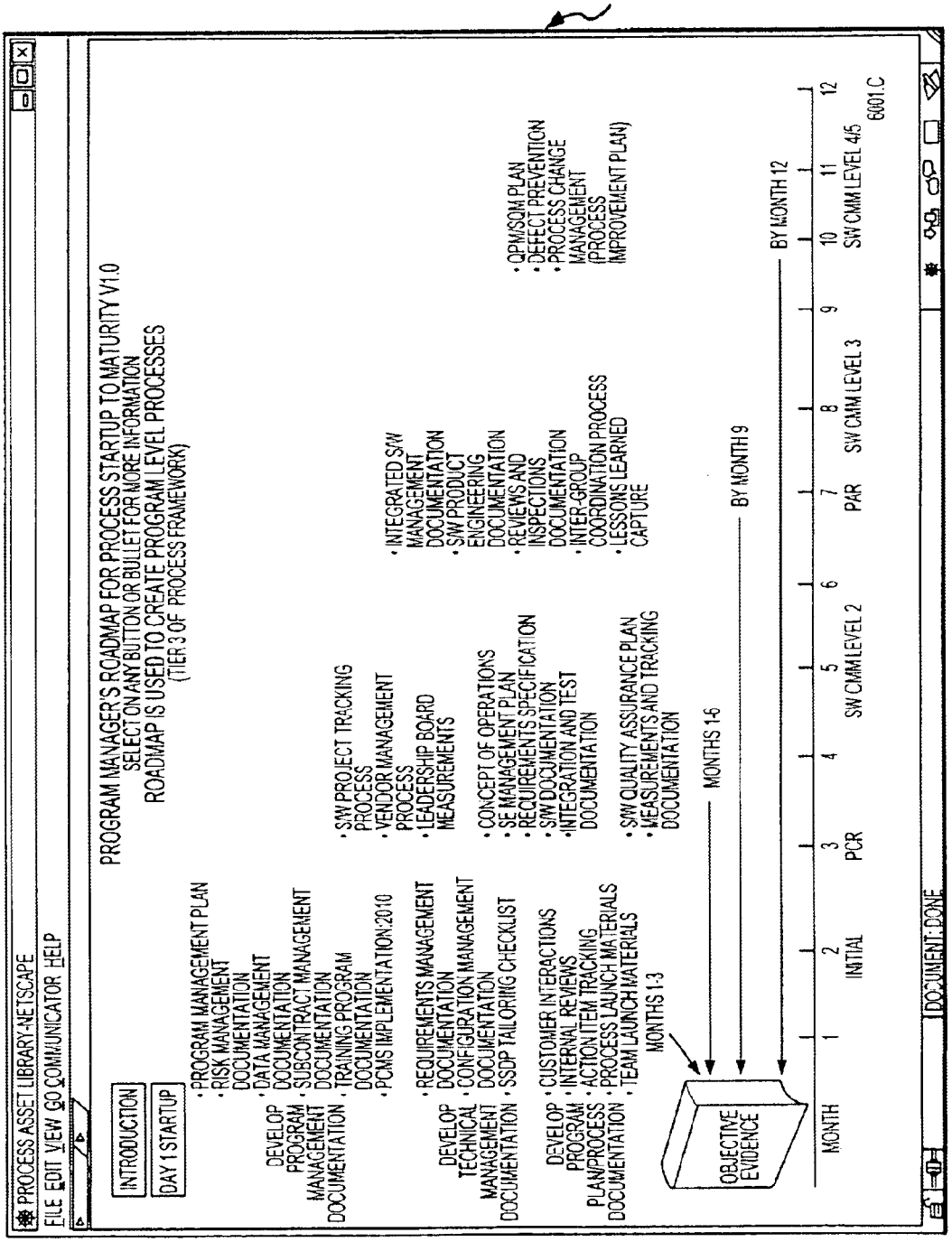
FIG. 14 discloses a screen display employable to review a road map for performing a task and selecting assets which may be employed as part of that process.

Selection of these options on the home page will provide for the presentation of screen displays such as those disclosed in FIGS. 11–13. When the certified assets link 70 is selected from the home page, the system initiates a search and generates a screen display 190 such as that shown in FIG. 11. Screen display 190 includes a listing of certified assets which have been identified in the search, presented in a desired format.

Disclosed in FIG. 12, is a screen display 200 which is generated when link 74 on the homepage is selected and a search is initiated to locate draft assets. Screen display 200 includes a listing of draft assets which have been identified in the search, presented in a desired format.

Finally, disclosed in FIG. 13, is screen display 210 which is generated when link 72 on the home page is selected and a search to locate sample assets is performed. Screen display 210 includes a listing of sample assets which have been identified in the search, presented in a desired format. With regards to the listing assets provided in screen displays 190, 200, and 210, the system user simply selects the link for a particular asset in order to view additional information and eventually access the electronic document.

According to the system described herein, another environment in which a particular asset may be presented is within a larger overall process or a "process maturity road map". The road map may be employed to provide direction to individuals in a particular organization to what process and procedures shall be employed at different stages of a project or program. As such, the system may be configured to include one or more screen displays which include descriptive information as to the work process being performed and links to process assets which are to be employed at the different stages.

Further, the road map may identify documentation required for a program and provide corresponding samples. The road map provides a top-level view of documentation that is required during the program's initial stages to achieve compliance with a pre-set standard. It also identifies items that need to be addressed in order to obtain various levels of process maturity. The intent of the road map is to simplify the manager's task in identifying the program documentation that is required. This simplification may occur because the road map provides a checklist of all required documentation along with access to examples. For example, on day one of a program, a program manager may not need to search for documents because the documents will be easily accessible through hyperlinks which provide links to examples and templates and provide references to particular sets.

In the road map incorporated into the system described herein, a sequence of screen displays may be accessible by a system user, each of which includes descriptions of particular stages in the program development process. Referring again to FIG. 5a, link 68 may be selected on the home page and a series of screen displays (link 86) may be presented. Included on these displays may be textual descriptive information, as well as links to assets which may be accessed and viewed at particular stages of a program or project. An example screen display 220 for a road map is disclosed in FIG. 16. Included therein are links through which any number of assets which are employable during the first one to three months of a particular program may be accessed. There is then a separate listing of links which are selectable to access assets which are applicable during another stage of the program, and finally a listing of assets is provided which are employable during the final stages of a program or to provide a re-cap or to act as an information gathering function with regards to a particular program or project. Once a particular asset is selected, the identification information for the asset may be presented, and the system user is then provided the option of opening any associated electronic documents in a desired format.

Figure 5B:
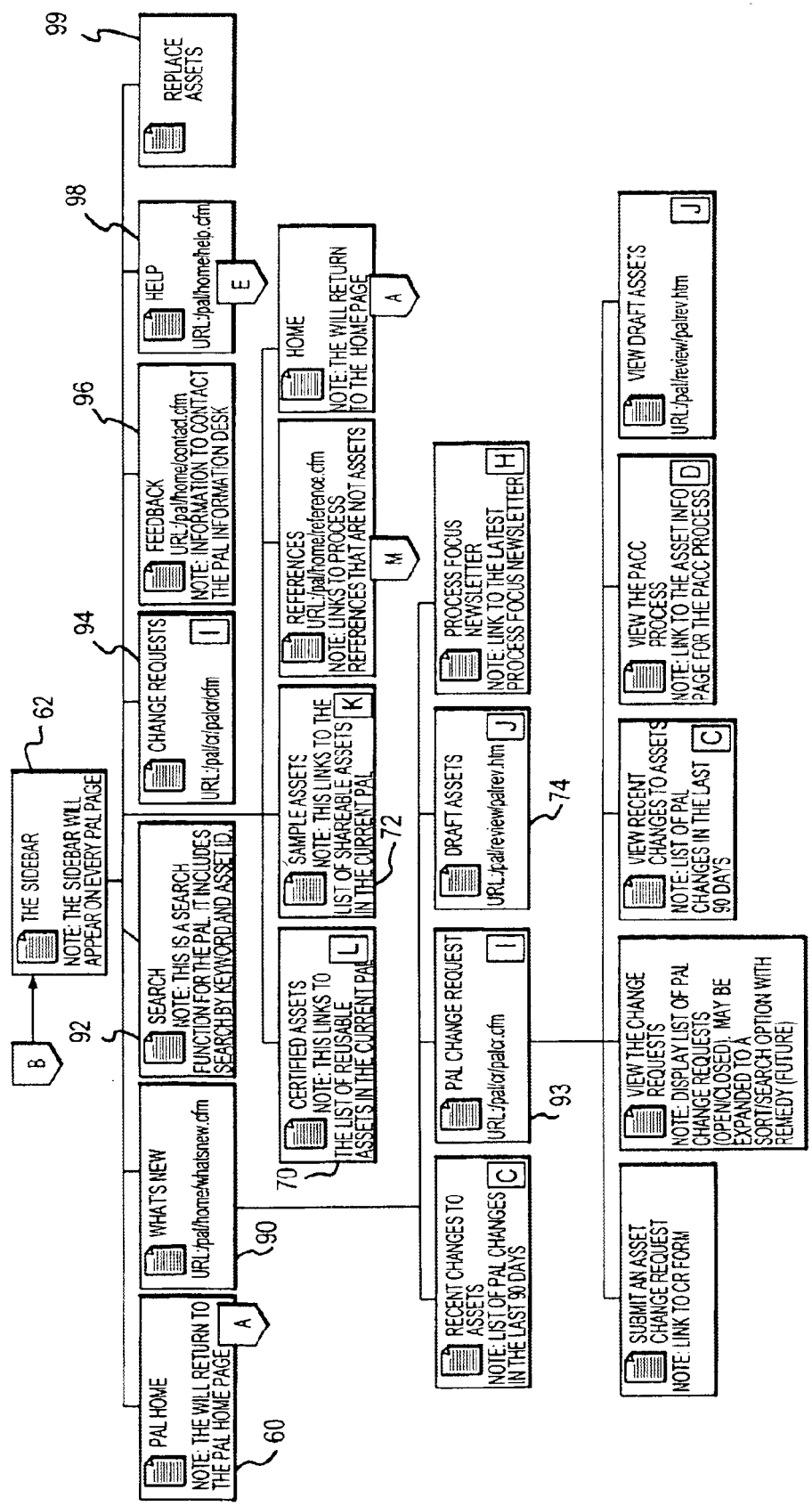

As a basic way to search, the system described herein may further include a search page which in addition to providing the functionality to search by process area and tier, provides the functionality to search by key word, asset number, or any other identifying information. A search by key word will allow the user to enter into any field a string of ASCII characters. The search engine will find and display all assets containing the strings in the title or the contents. Finally, the functionality may also be included for performing compound searches. For example, if a system user wishes to search a particular tier but for only assets within a particular process area, multiple search terms may be entered and the search engine will employ these to locate the matching assets. The search function may be initiated through selection of link 92 in the diagram of FIG. 5b.

As the system is employed and various processes and assets evolve over time, it may become necessary to make changes to one or more of the assets. Incorporated into the system described herein is a mechanism for submitting change requests, viewing change requests which have been submitted by others, viewing recently amended assets, as well as viewing the status of a submitted change request within the system.

Figure 15:
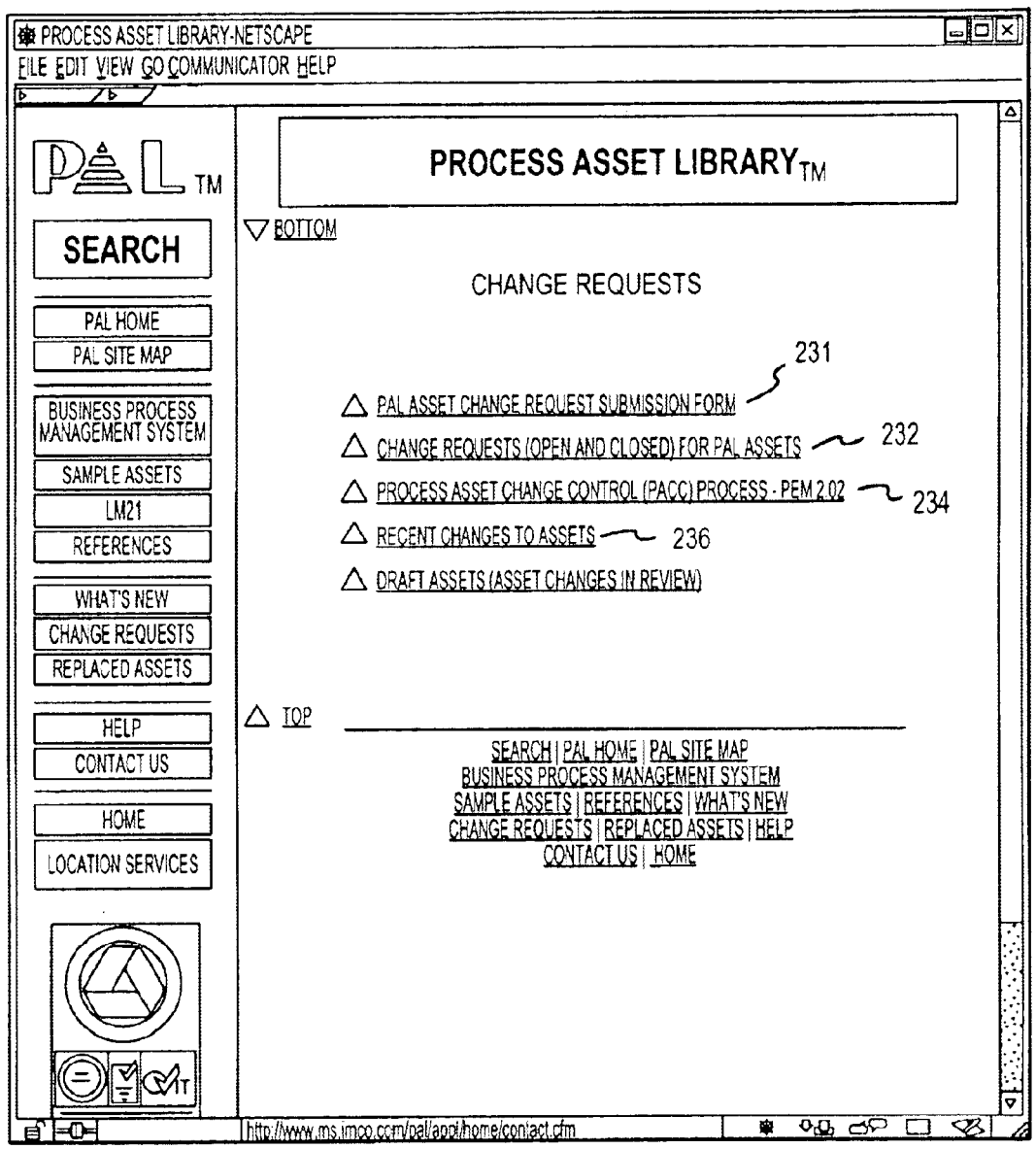
FIG. 15 discloses a screen display employable to view various information with regards to change requests, access recent changes to assets or submitted change requests.

As was shown in FIGS. 3a and b, one or more change requests 124 may be incorporated within a particular process asset 120. As stored within the database, the change request is a separate record which is accessible through performance of a search using identification information unique to that change request, or through opening a particular asset and accessing and change requests which are associated therewith. Through selection of change request link 93 in FIG. 5b, a screen display 230 such as that disclosed in FIG. 15 may be presented to the system user. This screen display provides numerous options for accessing and displaying change requests and data related to the change requests. For example a listing of change requests in HTML format may be compiled through selection of the link 232. A form for entering a change request may be presented through selection of link 231. A listing of assets which have been recently amended may be presented by selection of link 236. Finally the process for change control may be presented through selection of link 234. The change request approval process will be described in greater detail below.

Before a change request may be implemented as a change directive, it goes through various review steps where input to the final product is provided by a lot of different parties within the organization. For example a change request may need review and approval of a engineering group, a review board, as well as a quality review board. As a change request goes through the review process it may be desirable to view the status of the change request, review comments of the reviewers, as well as other information which may be relevant to the approval of a change request. According to the system described herein, the mechanism is provided to update the status of the change request over the data network as it is being reviewed by the various parties. This status information can be included in the classification identifiers for the change request and links may be provided to electronic documentation when a particular change request is reviewed.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A computer implemented system for accessing and presenting information on a graphical user interface relating to assets of an organization, the assets comprising processes and procedures for the organization, said system comprising:

a plurality of assets each stored in a single location in a database wherein each of the assets has a profile associated therewith and each of the profiles includes a plurality of hierarchical identifiers, wherein the hierarchal identifiers include a plurality of tier designations associated with particular organizational levels within the organization, wherein the tier designations include: tier 0 which relates to organization policy statements, tier 1 which relates to policy documents which relate to a unit within the organization, tier 2 which relates to the unit's processes and procedures, tier 3 which relates to processes and procedures for one or more subunits, and tier 4 which relates to information not otherwise classifiable;

a plurality of interactive screen displays, each presentable on a user interface and accessible over a data network, at least one of the interactive screen displays including the tier designations which are user selectable therefrom;

a search and compile apparatus, which in response to a user selected tier designation from one of the interactive screen displays, performs a search of the profiles and identifies the assets which include the selected tier designation; and a user interface page generator which based on selections made by a system user dynamically generates one or more pages which include selected data for the identified assets, wherein the one or more pages are presentable on a user interface device and configured such that the selected data for the identified assets is further selectable by a system user and associated data for the identified assets is presentable on the user interface device, wherein the associated data includes at least a document version of the asset and any change requests associated with the asset.

2. The system of claim 1 wherein the hierarchal identifiers further includes at least one of: a functional area, a certified asset designation, a sample asset designation, a draft asset designation, a serial number, and an alphanumeric title.

3. The system of claim 1 wherein the associated data further includes at least one of replaced assets and sample assets.

4. The system of claim 1 wherein the associated information is accessible through a database link establishable with the profile.

5. The system of claim 1 wherein the data network includes at least one of: the Internet, an intranet, a local area network (LAN), and the at least one page and the one or more generated pages are accessible employing at least one of: a web browser, a web server, an HTML page generator, and one or more relational databases.

6. The system of claim 1 further configured to selectively limit access to the assets.

7. The system of claim 1 wherein the one or more pages are configured so that a system user may enter one or more of the change requests relating to one or more of the assets and the system is configured to automatically associate the one or more change requests with the profile for the one or more assets.

8. The system of claim 1 wherein the one or more pages may be configured as a road map including one or more links to the assets related to an overall process described in the road map.

9. The system of claim 8 wherein the overall process is initiation and operating of a program within the organization.

10. A computer implemented method of accessing and presenting stored assets of an organization on a user interface, the assets comprising processes and procedures for the organization, said method comprising the steps of:

associating a profile with each of the stored assets wherein each of the profiles includes a plurality of hierarchal identifiers, the hierarchal identifiers including a plurality of tier designations associated with particular organizational levels within the organization, wherein the tier designations include: tier 0 which relates to organization policy statements, tier 1 which relates to policy documents which relate to a unit within the organization, tier 2 which relates to the unit's processes and procedures, tier 3 which relates to processes and procedures for one or more subunits, and tier 4 which relates to information not otherwise classifiable;

detecting a connection of a system user over a data network and presenting at least one interactive screen display which includes the tier designations which are user selectable therefrom;

based on a selected tier designation by a system user, searching the profiles of the stored assets to identify the profiles which include the selected tier designation;

dynamically generating one or more pages for presentation on the display which include identification information for all assets with profiles which include the selected tier designation, wherein the identification information for the assets is further selectable by the system user and associated data for the assets associated with the identified profiles is presentable;

presenting links to document forms of the assets as apart of the associated data; and presenting links to any change requests associated with the assets as part of the associated data.

11. The method of claim 10 wherein the data network comprises at least one of: the Internet, an intranet, and a local area network (LAN).

12. The method of claim 11 wherein the connection established by a system user may be performed using a web browser.

13. The method of claim 11 wherein the display page and the one or more pages are in HTML format.

14. The method of claim 10 wherein the hierarchal identifiers further includes at least one of: a functional area, a certified asset designation, a sample asset designation, a draft asset designation, a serial number, and an alphanumeric title.

15. The method of claim 10 further comprising the step of presenting links to at least one of replaced assets and sample assets, as part of the associated data.

16. The method of claim 10 further comprising the step of receiving one more change requests through the one or more interfaces and associating the one or more change requests with the profile of the associated stored asset.

17. The method of claim 10 further comprising the step of controlling access to the asset based on the type of hierarchal identifier associated with the asset.

18. The method of claim 10 further comprising the step of presenting a road map on the one or more pages which describes an internal process of the organization wherein the roadmap includes links to one or more of the assets.

19. The method of claim 10 further comprising the step of providing a search function through which search terms may be entered and employed to locate one or more of the assets.

20. The system of claim 2 wherein at least one of the functional area, certified asset designation, sample asset designation, draft asset designation, serial number, and alphanumeric title hierarchal identifiers is included in at least one of the interactive screen displays and is user selectable therefrom, and wherein the search and compile apparatus performs a search of the profiles and identifies the assets which include at least one of the functional area, certified asset designation, sample asset designation, draft asset designation, serial number, and alphanumeric title hierarchal identifiers upon selection thereof.

21. The method of claim 14 further comprising:

presenting at least one interactive screen display which includes at least one of the functional area, certified asset designation, sample asset designation, draft asset designation, serial number, and alphanumeric title hierarchal identifiers which is user selectable therefrom; and based on one of the functional area, certified asset designation, sample asset designation, draft asset designation, serial number, and alphanumeric title hierarchal identifiers selected by a system user, searching the profiles of the stored assets to identify the profiles which include the selected one of the functional area, certified asset designation, sample asset designation, draft asset designation, serial number, and alphanumeric title hierarchal identifiers.

\* \* \* \* \*

UNITED STATES PATENT AND TRADEMARK OFFICE
CERTIFICATE OF CORRECTION

PATENT NO. : 6,990,482 B1
DATED : January 24, 2006
INVENTOR(S) : Piotrowski et al.

It is certified that error appears in the above-identified patent and that said Letters Patent is hereby corrected as shown below:

Column 13,
Line 7, delete "hierarchical" and insert -- hierarchal --.

Column 14,
Line 45, delete "includes", and insert -- include --.

Signed and Sealed this

Eighteenth Day of April, 2006

JON W. DUDAS
*Director of the United States Patent and Trademark Office*